United States Patent Office 2,870,179
Patented Jan. 20, 1959

2,870,179
HYDROGENATION OF PHOSPHATIDES

Giovanni Jacini, Milan, Italy, assignor to American Lecithin Co., Inc., Woodside, N. Y., a corporation of Ohio No Drawing. Application August 10, 1954
Serial No. 449,026

21 Claims. (Cl. 260—403)

The present invention relates to the hydrogenation of phosphatides.

The present invention has a particular application to the hydrogenation of phosphatides such as commercial lecithin, which is a complex comprising vegetable oil, sterols, fatty acid, carbohydrates with a major proportion of various phosphatides such as lecithin, cephalin and lipositol.

It is among the particular objects of the present invention to develop a procedure of enhancing organic compounds, such as phosphatides or lecithin and commercial preparations thereof, which will enable increase in their stability.

Commercial lecithin, such as derived from soybeans, either in substantially oil-free form or in its commercial composition in which there is a mixture of about 65% of lecithin and associated phosphatides, cephalin and inositol phosphatides chiefly, and 35% of soya bean oil, often cannot be conveniently utilized because it deteriorates on heating to temperatures of about 100° C., or somewhat higher, temperatures which do not destroy ordinary fatty oils (triglycerides).

Commercial lecithin normally will not long retain its plasticizing and film-forming properties in mixtures containing moisture and when subjected to pressure. Furthermore, the vegetable oil present in commercial lecithin may separate to render the product un-uniform and unsaleable.

It is among the specific objects of the present invention to prepare novel lecithin products which will be stable over long periods of time, either by themselves or in combinations with oily materials or organic products and which as compared with ordinary lecithin will be improved in color and have a less objectionable odor and which will be more neutral and bland than products usually produced from commercial lecithin and more resistant to breakdown at elevated temperatures.

Another specific object of the present invention is to provide a modified lecithin preparation which will blend itself more readily and completely with oily or fat-containing materials, such as oily or fatty foodstuffs, industrial wax compositions, lubricating oils either of the paraffin or naphthenic type and particularly with compositions which are used for metal-working or rust-preventing purposes or anti-oxidant purposes.

A still further specific object of the present invention is to provide a novel phosphatide or lecithin preparation of uniform consistency with a good odor and of plastic or wax-like character which may be stored for long periods of time without deterioration.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to hydrogenate commercial lecithin or phosphatide compositions in general, under such conditions of pressure and temperature and with such catalyst that the lecithin molecule is not broken down and with the modified lecithin retaining in an enhanced form the surface-active characteristics of the stabilization of the original phosphatides or lecithin.

It has been found that this may be accomplished by treating the commercial lecithin or phosphatides with metal or metal oxide catalysts at elevated temperatures of 75° to 80° C. and at pressures of 100 to 110 atmospheres.

Preferably the reaction is carried out at about 70° to 100° C. with pressures varying from about 70 to 125 or 150 atmospheres until the iodine number drops substantially below 35 and desirably to the range of 10 to 30 from the initial value of above 50. The minimum pressure used should be 50 atmospheres but preferably at least 70 atmospheres should be employed.

The preferred catalysts are nickel and platinum combinations and it has been found that unusually satisfactory results may be obtained with a flaked nickel catalyst which has been previously dispersed in oil by depositing a suspension of reduced nickel dispersed in oil upon a chilled, rotating roll of a flaking machine. The suspension oil is desirably a solidified hydrogenated oil.

Surprisingly, an altogether different type of product is obtained than when lesser pressures are employed.

It seems to be important in the hydrogenation of phosphatides that relatively larger quantities of catalysts be employed with higher temperatures and pressures than are normally used with the hydrogenation of oil.

It is necessary that any oil that is present in the phosphatide or lecithin composition be saturated with hydrogen before the lecithin is partly or fully saturated, and it has been found that the lecithin will not saturate or pick up the hydrogen until all of the unsaturated bond in any glyceride oil that may be present will have taken up their full hydrogen quota.

The preferred catalyst is flaked nickel catalyst in amounts ranging from 1 to 5% and desirably at 3 to 4%.

Mixtures of nickel and platinum have been found to be particularly satisfactory but with pressures in the order of 90 to 120 atmospheres.

The phosphatide mass should also be kept quite fluid and the catalyst should be thoroughly dispersed throughout the mass and the temperature should be kept below 110° to 120° C. to avoid any darkening.

It has been found quite satisfactory to have present about 30% of an unsaturated fatty oil, such as soya bean oil, since the saturation of the soya bean oil seems to catalyze the hydrogenation of the phosphatides. A larger volume of fat or oil may be present and other fluidizing material of suitable character, such as hydrocarbons, may be used.

The commercial lecithin may also be previously treated with peracetic acid to render it more susceptible to the hydrogenation and it may be bleached with peroxides before and after the hydrogenation. Animal lecithin may be used but phosphatides of vegetable origin (such as soya, corn, peanut or cottonseed) are more common and desirable.

As a final step, after the hydrogenation, the reaction mixture in liquid condition is processed, preferably at 70 to 100° C. to remove the catalyst.

There the hydrogenated composition is not filtered, ethyl acetate may be used to dissolve the fatty substance (including oil or fat and phosphatides), and leaving the catalyst. The ethyl acetate solution may then be chilled to 10° C., causing the phosphatides to precipitate while fatty oil remains in solution and purified hydrogenated phosphatides can be recovered. Ethyl acetate does not give colloidal solutions of the catalyst, especially in the presence of a small amount of weak electrolyte such as calcium chloride.

Example I

Using 5% flaked nickel catalyst and .05% platinum catalyst at 100 atm. pressure and at 100° C. for 4 hours, commercial soybean lecithin was hydrogenated and showed an iodine value of 32. At a temperature of 65° C. the iodine value was 55.

Example II

At a pressure of 70 atmospheres for 3 hours with temperature of 120° C. and 10% flaked nickel catalyst a hydrogenated commercial lecithin with an iodine value of 25 was obtained. On extraction with ethyl acetate, a purified hydrogenated phosphatide fraction equivalent to ⅔ of the original material was separated and this had an iodine value of 20 and analyzed 3.4% phosphorus. The hydrogenation improves the color of the phosphatide.

Commercial soybean lecithin which contains about 35% soy oil in association with the phosphatides has an iodine value of about 97 and a phosphorus content of 2.2%. While it may be hydrogenated directly, it is usually preferable to disperse or dissolve it in a suitable vehicle prior to hydrogenation.

For example, if the hydrogenated phosphatide is to be used in a lubricating oil, the hydrogenation may be carried out with a mixture of equal parts commercial lecithin and mineral oil. In this form the hydrogenated composition is also more easily filtered for recoverey of catalyst.

Example III

A sample of commercial lecithin was dissolved in one and a half parts of benzene (boiling point 50–60° C.) and using 1% platinum catalyst was subjected to hydrogenation at room temperature and pressure. When no more hydrogen was absorbed the composition was brought to a boil and filtered.

On standing, a white substance precipitated which was found to be tri-stearin amounting to ⅓ of the original commericial lecithin and having an iodine value of 3.8.

The remaining ⅔ recovered from the filtrate showed 3.4% phosphorous and an iodine value of 67, indicating it to be the phosphatide portion and little changed by hydrogenation. This procedure will provide a convenient means for making purified phosphatides which is superior to solvent extraction and at the same time it enhances the value of the separated triglyceride.

Example IV

Commercial lecithin was hydrogenated at 80° C. at an initial pressure of 1500 pounds per square inch, using a flaked nickel catalyst at a nickel to solids ratio of 4.0%. The lecithin employed of a viscous soya lecithin oil with an acid number of 25.5 and an iodine number of 68.1.

The hydrogenation was continued until the hydrogenation was no longer being absorbed by the liquid mixture. The following conditions were observed:

Batch weight of liquid
lecithin _____ 416.3 grams.
Flaked nickel catalyst _____ 68.8 grams (24.2% of nickel).
Initial pressure _____ 1510 lbs. per square inch at 28° C.
Reaction temperature _____ 80° C.
Reaction pressure _____ 1780 to 1630 lbs. per square inch.
Time at temperature _____ 2.5 hours.
Hydrogenation consumption _ 0.25 mol hydrogenation per 100 grams of solids.

The hydrogenated product was then processed by melting and filtering out the catalyst with a steam jacketed filter.

Instead of filtering, the hydrogenated product might be extracted first with hot ethanol and then with hot ethyl acetate. Following this, the two fractions are combined by dissolving both in hot ethyl acetate, cooling and filtering and drying the crystallized material. The hydrogenated lecithin is a light tan colored brittle wax having an acid No. 19.5 and an iodine No. 39.4.

Example V

Oil free phosphatides were employed dissolved in ethyl acetate. The hydrogenation was carried out at 80° C. under pressure varying from 1490 to 1800 lbs. per square inch. The hydrogenation was continued at temperature until several successive pressure readings remained constant, indicating that hydrogenation was no longer being taken up.

The following conditions were employed:

Weight of oil free phosphatide _____ 228 grams.
Weight of ethyl acetate _____ 827 grams.
Weight of flaked nickel _____ 37.6 grams (24.2% nickel in catalyst).
Initial pressure _____ 1490 lbs. per square inch at 25° C.
Reaction temperature _____ 80° C.
Reaction pressure _____ 1800 to 1690 lbs. per square inch.
Time at temperature _____ 3.5 hours.
Hydrogen consumption _____ 0.23 mol of hydrogen per 100 grams of solids.

The hydrogenated product was extracted by using hot toluol as a solvent and the hydrogenated product was thereafter crystallized out.

The hydrogenated oil free phosphatides are a brittle wax, from which a light colored fraction may be extracted by hot ethyl acetate.

Where the hydrogenation is carried out in the presence of a fatty oil or other suitable carrier, the finished product can be made with a lower acid number than where the phosphatide contains only a small amount of a fatty oil or fatty carrier, that is to say, fatty oil, for example, in addition to the carrier or fatty oil normally present (usually 30 to 35%) in commercial lecithins. In carrying out my invention in this way the phosphatides would be associated with not less than about 50% of fatty oil and preferably with about 70% of fatty oil (as determined by the acetone insoluble content).

Example VI

A mixture of 2 parts soybean oil and 1 part commercial lecithin hydrogenated at 70 atm. and 100° C. with 1.2% flaked nickel catalyst showed on filtration an iodine value of 33 and an acid number of 7.8. Subsequent bleaching with chlorite has less effect on acid number than bleaching with peroxide.

Samples of commercial soybean lecithin hydrogenated as such showed acid numbers of about 40.

Example VII

Equal parts of commercial soybean lecithin and soybean oil or cottonseed oil using 4% of flaked nickel (1%) were treated at 100° C. for 2½ hours at pressure of 1000 p. s. i. g. The products were filtered on adsorbent. Accelerated oxidation tests with cottonseed oil containing 0.1% of hydrogenated phosphatide and 0.1% of this phosphatide and 0.01% of iron oleate showed that the anti-oxidant property of the phosphatide had not been destroyed during hydrogenation.

The final product appears to have an improved odor, is slightly more acid and it may be readily bleached with hydrogen peroxide or sodium hypochlorite.

It is, desirably, finally heated in a vacuum with or without the passage of steam therethrough as a final treatment. If a fluidizing medium has been used which remains fluid, the phosphatide may be separated therefrom.

If desired, the hydrogenated lecithin, before or after hydrogenation, may be processed with phosphorus pentoxide in powder form in an amount ranging from 5 to 10% and it also may be treated with peracetic acid or other perorganic acids of low molecular weights in amounts ranging from 5 to 10%.

The final product is most readily miscible with oily or fatty materials and has a particularly satisfactory surface active property and it is highly stable and resists change in color or odor after it has been finally processed.

The present hydrogenation procedure is particularly useful in the treatment of mixtures of phosphatides and particularly mixed phosphatides of vegetable origin as they occur naturally in the form obtained by extracting the same from vegetable raw material with organic solvents.

These phosphatides while similar in many respects also exhibit independent characteristics, and these differences result in a lack of uniformity in the product and frequently cause variations in the effectiveness of the product when used.

The present hydrogenation procedure tends to increase the uniformity of the product and to lessen varying effectiveness in mixtures due to differences in the physical and chemical properties of the different phosphatides originally present in the extracted material. For example, where lecithin and cephalin differ in function as emulsifying agent, when commercial lecithin containing lecithin and cephalin is hydrogenated according to the present invention, the finished hydrogenated product is greatly superior in emulsifying characteristics, and the lecithin and cephalin now appear to have uniform emulsifying and surface active effectiveness.

For example, when 20 parts by weight of refined corn oil containing 5% of hydrogenated mixed vegetable phosphatides (such as commercial soybean lecithin) is mixed with 25 grams of water at 80° C. with stirring, a good emulsion is obtained which shows only slight separation after standing for three days. The product is light in color and possesses excellent body, and this emulsion is greatly superior to what can be obtained with ordinary commercial soybean lecithin.

Furthermore, the hydrogenated phosphatides appear to be greatly more effective than ordinary phosphatides in increasing the resistance of sweet chocolate coatings to "Fat Bloom" or graying.

For example, samples of chocolate containing 1% of ordinary commercial lecithin and 1% of hydrogenated commercial lecithin made according to the present invention were prepared and were deposited on sheets and solidified at room temperature.

The control chocolate was first to bloom and it was followed thereafter by the chocolate with 1% of the commercial lecithin, which prevented the blooming or graying for a considerable length of time. However, it was three to four times this period before the chocolate with the 1% hydrogenated commercial lecithin finally showed any sign of blooming or graying, indicating a many fold increase in effectiveness.

As a further test of this great increase in effectiveness, samples of these three chocolates containing no lecithin, 1% of ordinary lecithin and 1% of hydrogenated lecithin were placed in an oven at 85° F. for a short time and removed to room temperature with repetition in two weeks of the same heating procedure.

In each case the chocolates with the hydrogenated commercail lecithin remained much darker and glossier over long periods of time, whereas the control or untreated chocolate was subjected to blooming and graying quite promptly, and the sample treated with commercial lecithin was intermediate in its properties.

In connection with the various characteristics which have been found most satisfactory to give a superior hydrogenated commercial lecithin, the Rufert nickel catalyst has been found to be superior to the other catalysts mentioned, since it produces a product which results in less splitting of the lecithin and a greatly decreased formation of acidity and freer amines.

The embodiment of the invention described herein is to be considered merely as illustrative, as the invention is susceptible to variation, modification and change within the spirit and scope of the appended claims.

Having now particularly described and ascertained the nature of the invention, and in what manner the same is to be performed, what is claimed is:

1. A process of treating phosphatides which comprises subjecting them to hydrogenation at 75 to 80° C. at 100 to 150 atmospheres to reduce the iodine value to 10 to 30 and using 3 to 4% of a flaked nickel catalyst.

2. A process of treating phosphatides which comprises subjecting them to hydrogenation at 75 to 80° C. at 80 to 120 atmospheres to reduce the iodine value to 10 to 30 and using 3 to 4% of a flaked nickel catalyst.

3. A process of treating phosphatides which comprises subjecting them to hydrogenation at 75 to 80° C. at 100 to 150 atmospheres in the presence of a nickel catalyst to reduce the iodine value to 10 to 30 and using 3 to 4% of a flaked nickel catalyst.

4. A process of treating phosphatides which comprises subjecting them to hydrogenation at 75 to 80° C. at 50 to 150 atmospheres in the presence of finely powdered nickel and platinum as a catalyst.

5. A process of treating phosphatides which comprises subjecting them to hydrogenation at 75 to 80° C. at 100 to 150 atmospheres in the presence of 1% to 10% of a finely powdered metal catalyst.

6. A process of treating phosphatides which comprises subjecting them to hydrogenation at 75 to 80° C. at 100 to 150 atmospheres to reduce the iodine value.

7. A process of treating phosphatides which comprises subjecting them to hydrogenation at 100 to 150 atmospheres at a temperature of 70 to 125° C. in the presence of a catalyst to reduce the iodine value to 10 to 30 and using 3 to 4% of a flaked nickel catalyst.

8. A hydrogenated phosphatide having an iodine value of 10 to 30.

9. A hydrogenated vegetable phosphatide having an iodine value of 10 to 30.

10. A hydrogenated lecithin having an iodine value of 10 to 30.

11. A hydrogenated commercial lecithin in which both the oil and the lecithin have been hydrogenated having an iodine value of 10 to 30.

12. A hydrogenated composition comprising phosphatide and a soya bean oil having an iodine value of 10 to 30.

13. Hydrogenated soybean phosphatide material having an iodine value of 15 to 50.

14. A process of treating phosphatides which comprises subjecting them to hydrogenation at 75 to 80° C. at 100 to 150 atmospheres in the presence of a catalyst to reduce the iodine value to 10 to 30 and using 3 to 4% of a flaked nickel catalyst and then treating with an organic solvent to dissolve the phosphatides and leave the catalyst and then chilling out the phosphatides.

15. A process of treating phosphatides which comprises subjecting them to hydrogenation at 75 to 80° C. at 100 to 150 atmospheres in the presence of a metallic catalyst to reduce the iodine value to 10 to 30 and using 3 to 4% of a flaked nickel catalyst and then dissolving the phosphatides away from the catalyst with ethyl acetate.

16. A process of separating fatty oils from commercial phosphatides which comprises dissolving the phosphatides in an organic solvent, hydrogenating the oil at 75 to 80° C. to reduce the iodine value to 10 to 30 and using 3 to 4% of a flaked nickel catalyst, precipitating the hydrogenated oil from the solution, filtering away the hydrogenated oil and then recovering the oil depleted phosphatides.

17. A process of separating fatty oils from commercial phosphatides which comprises hydrogenating at 75 to 80° C. under conditions which will cause hydrogenation of the fatty oils but not the phosphatides to reduce the iodine value to 10 to 30 and using 3 to 4% of a flaked nickel catalyst and thereafter separating the hydrogenated fatty oil from the phosphatide.

18. A process of hydrogenating lecithin which comprises treating lecithin in the presence of about 30% soya bean oil at pressures of 100 to 150 atmospheres at temperatures of 70 to 100° C. until the iodine number drops from about 50 down to 10 to 30 in the presence of 3 to 4% of a flaked nickel catalyst.

19. The process of claim 18, said lecithin having been previously treated with peracetic acid.

20. A process of hydrogenating lecithin containing 30 percent of soya bean oil to reduce its iodine value to a range of 10 to 30 from a value of above 50 which comprises first treating it with peracetic acid and then treating with gaseous hydrogen in the presence of a flaked nickel catalyst containing platinum in an amount of 3 to 4% at pressures of 100 to 150 atmospheres at 70 to 100° C. to cause the soya bean oil first to become saturated with hydrogen and then finally dissolving in ethyl acetate to remove the residual catalyst and then chilling the ethyl acetate solution to 10° C. to precipitate the hydrogenated lecithin while the hydrogenated soya bean oil remains in solution.

21. The surface active hydrogenated lecithin retaining its original molecular complex having high emulsifying properties produced according to claim 20.

References Cited in the file of this patent

UNITED STATES PATENTS

| | | |
|---|---|---|
| 2,295,192 | Arveson | Sept. 8, 1942 |

FOREIGN PATENTS

| | | |
|---|---|---|
| 256,998 | Germany | Feb. 24, 1913 |
| 144,895 | Great Britain | June 24, 1920 |
| 389,298 | Germany | Jan. 29, 1924 |
| 389,299 | Germany | Jan. 29, 1924 |

OTHER REFERENCES

Shinozaki et al.: "J. Soc. Chem. Ind. Japan," vol. 37, supplemental binding (1934), pp. 432–433.

Wittcoff: "The Phosphatides." Copyright 1951, pp. 60 and 502.